(12) United States Patent
Nanami et al.

(10) Patent No.: US 6,555,497 B2
(45) Date of Patent: Apr. 29, 2003

(54) AMMINE SOLUTION

(75) Inventors: Toshiyuki Nanami, Ogasa-gun (JP); Eisaku Kondo, Ogasa-gun (JP)

(73) Assignee: Cataler Corporation, Ogasa (JP)

( * ) Notice: Subject to any disclaimer, the term of this patent is extended or adjusted under 35 U.S.C. 154(b) by 0 days.

(21) Appl. No.: 09/871,683

(22) Filed: Jun. 4, 2001

(65) Prior Publication Data

US 2002/0147106 A1 Oct. 10, 2002

(30) Foreign Application Priority Data

Feb. 2, 2001 (JP) ........................... 2001-026853

(51) Int. Cl.$^7$ ................... B01J 23/42; B01J 31/00; B01J 27/24; B22F 7/00; C09D 5/00
(52) U.S. Cl. ............... 502/339; 502/164; 502/200; 106/1.21; 106/1.28; 106/287.18
(58) Field of Search ............... 106/1.21, 1.28, 106/287.18; 502/339, 164, 200

(56) References Cited

U.S. PATENT DOCUMENTS 5,292,361 A * 3/1994 Otsuka et al. ............. 106/1.28

* cited by examiner

*Primary Examiner*—Mark L. Bell
*Assistant Examiner*—Patricia L. Hailey
(74) *Attorney, Agent, or Firm*—Oliff & Berridge, PLC

(57) ABSTRACT

An ammine solution which can be provided at low production cost, as compared with conventional ones. The ammine solution contains an ammine compound which contains at least one of platinum and palladium, and at least one kind of amine compound. By using the amine compound of which the boiling point is raised, as compared with that of ammonia, due to the substitution of substitution radicals for some of hydrogens in ammonia molecules, the volatilizing speed from the ammine solution can be restrained.

6 Claims, No Drawings

AMMINE SOLUTION

BACKGROUND OF THE INVENTION

1. Field of the Invention

The present invention relates to an ammine solution in which an ammine compound including at least one of platinum and palladium is dissolved, and more particularly, to an ammine solution which exhibits excellent chemical stability.

2. Description of the Related Art

Platinum group elements such as platinum and palladium have been used in catalysts for purifying exhaust gases of motor vehicles, for example, and have performed important parts therein. To prepare these catalysts, various kinds of platinum group compounds-containing materials have been used in accordance with the use or the like of catalysts. Examples of these platinum group compounds-containing materials include ammine solutions in which ammine compounds are dissolved. The ammine solutions exhibit excellent thermal decomposition properties, weak coat-carrying properties because of basic characteristics, and properties of facilitating control of carrying amount with water absorption. Accordingly, the ammine solutions can be preferably used in preparing catalysts.

The ammine compounds for use in the conventional ammine solutions have been prepared by amminizing chlorides such as chloroplatinic acid as starting materials. Accordingly, the ammine solutions prepared using the ammine compounds include a large amount of halogen as catalyst poison with the result that troublesome operations for removing halogen are required to cause increased production cost.

SUMMARY OF THE INVENTION

It is an object of the present invention to provide an ammine solution which can be produced at cost lower than that in the case of the conventional ammine solution.

The present inventors have earnestly studied to attain the above-described object.

At first, they have examined ammine solutions produced by dissolving ammine compounds composed of platinum group elements, which do not contain halogen, such as dinitrodiammine platinum, in ammonia. As a result, they have succeeded in obtaining a practical ammine solution in which ammine compounds can be readily dissolved. Insoluble crystals, however, precipitate with the passage of time, which is inconvenient in practical application.

To investigate the reason therefor, the dissolving conditions of the ammine compounds in ammonia have been examined. As a result, it has been cleared up that as ammonia volatilizes from the prepared ammine solution and the amount of ammonia therein decreases, the insoluble crystals precipitate. This can be considered to be caused by that as ammonia volatilizes, or resultant shift of the pH value to the neutral side occurs, the solution becomes unstable.

However, by changing only the dissolving conditions while using ammonia, the precipitation of the insoluble crystals due to the volatilization of ammonia has been difficult to completely restrain. The volatilization of ammonia can be prevented by improving the device for preparing catalysts, too. However, it is considered that the device cost increases to make it difficult to reduce the overall production cost.

Accordingly, materials other than ammonia, which can dissolve the ammine compounds with a small volatilizing amount, have been investigated. Consequently, the present inventors have contemplated using specific amine compounds. The present invention has been made based on the above-described present inventors' knowledge and contemplation.

More specifically, the ammine solution of the present invention is characterized by an ammine compound which contains at least one of platinum and palladium, and at least one kind of amine compound being included.

The preferred ammine compound is dinitrodiammine platinum or dinitrodiammine palladium.

The preferred boiling point of the amine compound is 100° C. or more.

Furthermore, the preferred amine compound is 2-amino ethanol, considering the cost and handling properties.

Other objects, features, and characteristics of the present invention will become apparent upon consideration of the following description and the appended claims, all of which form a part of this specification.

DETAILED DESCRIPTION OF THE PRESENTLY PREFERRED EXEMPLARY EMBODIMENTS

Hereinafter, the ammine solution in accordance with the present invention will be explained. The ammine solution is used to produce catalysts, for example. A catalyst substrate is immersed in the ammine solution and then burned. A resultant catalyst can carry platinum or the like on a surface thereof. The ammine solution of the present invention is prepared by dissolving ammine compounds and amine compounds in a solvent.

The solvent for use in the ammine solution of the present invention is normally water. Alternatively, alcohol or the like can be used solely or as a mixture with water. It is preferable that the ammine solution does not contain any catalyst poison such as halogen.

The ammine compounds contain at least one of platinum and palladium, but do not contain halogen elements. Examples of the ammine compounds include dinitrodiammine platinum, dinitrodiammine palladium, platinum ammine nitrate (2 valance), and palladium ammine nitrate (2 valance). Dinitrodiammine platinum and dinitrodiammine palladium out of these ammine compounds are preferable because of low costs, easiness of obtaining, concentrating properties of platinum and palladium in solution, or the like.

Conventionally, the concentration of the ammine compounds in ammine solutions has been about 0.3 mol/L. In contrast, the ammine solution in accordance with the present invention can contain ammine compounds in the concentration higher than that of the conventional ammine solutions. Specifically, the concentration of the ammine compounds can range from 0.1 to 1 mol/L.

Amine compounds have the arrangement that substitution radicals are substituted for some hydrogen elements in ammonia molecules, thereby raising the boiling point higher than that of ammonia, and consequently, restraining the volatilizing speed thereof. The preferred boiling point of the amine compounds is 100 ° C. or more, which is equal or higher than the boiling point of water as a generally available solvent. The more preferred boiling point of the amine compounds is not more than the burning temperature of the catalysts such that all the amine compounds volatilize by burning without remaining in final products of catalysts.

Examples of preferred amine compounds having high boiling points include aniline (boiling point: 184° C.), 2-amino ethanol (boiling point: 170.5° C.), 2 (methyl amino) ethanol (boiling point: 169° C.), dibutyl amine (boiling point: 159° C.), tripropyl amine (boiling point: 156.5° C.), heptyl amine (boiling point: 155° C.), cyclohexyl amine (boiling point: 134° C.), ethylene diamine (boiling point: 116.5° C.) and dipropyl amine (boiling point: 110° C.). One of these amine compounds can be added, or a mixture of a plurality of these amine compounds can be used.

The more preferred amine compounds out of above examples are 2-amino ethanol, aniline, and cyclohexyl amine considering production cost. And 2-amino ethanol is especially preferable in production cost, safety and solubility of ammine compounds.

By regulating the final pH of the ammine solution to about 10 to 13, the chemical stability of the solution is improved. The regulation of the pH of the ammine solution may be performed with only ammine compounds. Alternatively, it may be performed by adding ammonia or the like as a pH regulator to the ammine solution. The preferred concentration of the amine compounds in the ammine solution ranges from 0.4 to 4 mol/L.

The method for dissolving the ammine compounds and the amine compounds in the solvent is not limited specifically. A normal method can be adapted therefor. For example, there are the method of adding the ammine compounds and the amine compounds to the solvent, and leaving them for a while, the method of stirring them, and the method of stirring them while heating.

(Embodiment 1)

100 mL of ammonia water was added to 33.5 g of dinitrodiammine platinum crystal, and a resultant mixture was warmed with a condenser at about 80° C. for 10 hours while stirring thoroughly to dissolve dinitrodiammine platinum crystal in ammonia water, thus obtaining an ammine solution.

The ammine solution thus obtained was cooled and divided equally. 10 mL of 2-amino ethanol was added to resultant one ammine solution, and pure water was added thereto until 100 mL of ammine solution was obtained.

COMPARATIVE EXAMPLE 1

Pure water was added to the other ammine solution obtained by equally dividing the cooled ammine solution in Embodiment 1 until 100 mL of ammine solution was obtained.

(Embodiment 2)

50 mL of ammonia water and 10 mL of 2-amino ethanol were added to 16.7 g of dinitrodiammine platinum crystal, and a resultant mixture was warmed with a condenser at about 80° C. for 10 hours while stirring thoroughly to dissolve dinitrodiammine platinum crystal in ammonia water, thus obtaining an ammine solution. The ammine solution thus obtained was cooled, and pure water was added until 100 mL of ammine solution was obtained.

(Experiment)

The ammine solutions of the preceding Embodiments and Comparative example were respectively put in a beaker of 100 ML, and left uncovered within a hood. Then, it was observed whether insoluble crystals precipitated or not. The observation results are shown in TABLE 1.

TABLE 1

| | after 1 day | | after 1 week | |
|---|---|---|---|---|
| | precipitation of insoluble crystals | pH of solution | precipitation of insoluble crystals | pH of solution |
| Embodiment 1 | none | 12.1 | none | 10.9 |
| Embodiment 2 | none | 12.0 | none | 10.9 |
| Comparative example 1 | a little precipitation | 11.2 | considerable precipitation | 7.5 |

As is apparent from the results of TABLE 1, in the ammine solutions of Embodiments 1 and 2, each containing amine compounds, the long-lasting chemical stability of solution could be effected, and in contrast, in the ammine solution of Comparative example 1 containing no amine compound, insoluble crystals precipitated even after only one day, thus causing stability problems. As can be seen from the results that the pH value of the solution of Comparative example 1 decreased to 11.2 after 1 day, and to 7.5 after 1 week, and in contrast, the pH values of the ammine solutions of Embodiments merely decreased to 10.9 even after 1 week, it is considered that in the ammine solution of Comparative example 1 of which the pH value was regulated to the alkali side by only volatile ammonia, ammonia volatilizes and the amount thereof decreased while being left, and consequently the ammine compounds could not be stably dissolved to precipitate as insoluble crystals.

(Embodiment 3)

100 mL of ammonia water was added to 43.7 g of dinitrodiammine palladium crystal, and a resultant mixture was warmed with a condenser at about 80° C. for 10 hours while stirring thoroughly, thus obtaining an ammine solution.

The ammine solution thus obtained was cooled and divided equally. 10 mL of 2-amino ethanol was added to resultant one ammine solution, and pure water was added until 100 mL of ammine solution was obtained.

COMPARATIVE EXAMPLE 2

Pure water was added to the other ammine solution obtained by equally dividing the cooled ammine solution in Embodiment 3 until 100 mL of ammine solution was obtained.

(Experiment)

The ammine solutions of Embodiment 3 and Comparative example 2 were respectively put in a beaker of 100 mL, and left uncovered within a hood. Then, it was observed whether insoluble crystals precipitated or not. The observation results are shown in TABLE 2.

TABLE 2

| | after 1 day | | after 1 week | |
|---|---|---|---|---|
| | precipitation of insoluble crystals | pH of solution | precipitation of insoluble crystals | pH of solution |
| Embodiment 3 | none | 12.2 | none | 10.9 |
| Comparative example 2 | a little precipitation | 11.0 | considerable precipitation | 7.4 |

As is apparent from the results of TABLE 2, in the ammine solution of Embodiment 3, to which an amine compound was added, the long-lasting chemical stability of solution could be effected, and in contrast, in the ammine solution of Comparative example 2, which did not contain any amine compound, insoluble crystals precipitated even after only one day, thus causing stability problems. The experimental results show that the ammine solutions, each containing palladium, exhibited results similar to those of Embodiments 1 and 2 and Comparative example 1, each containing platinum.

Furthermore, detailed experimental results are not shown, but in the case where 2-amino ethanol which was used in Embodiments 1 through 3 as the amine compound was replaced with aniline, 2 (methyl amino) ethanol, dibutyl amine, tripropyl amine, heptyl amine, cyclohexyl amine, etylene diamine or dipropyl amine, prepared ammine solutions exhibited long-lasting chemical stability over one week or more, similarly to Embodiments 1 through 3.

In accordance with the present invention, by substituting amine compounds for one part or all of ammonia in the conventional ammine solution, resultant ammine solutions can be used stably, and consequently, can be provided at low production cost, as compared with the conventional ammine solution. As a result, catalysts can be produced at low cost using inexpensive ammine solutions. In addition, the ammine solutions of the present invention can contain an increased amount of platinum or palladium, as compared with the conventional ammine solutions, thus enabling improvement of handling properties.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An ammine solution containing:

an ammine compound which contains at least one of platinum and palladium, and at least one kind of amine compound, wherein said ammine solution has a pH value greater than 10.

2. An ammine solution as claimed in claim 1, wherein said ammine compound is composed of at least one of dinitrodiammine platinum and dinitrodiammine palladium.

3. An ammine solution as claimed in claim 2, wherein said amine compound has a boiling point of 100° C. or more.

4. An ammine solution as claimed in claim 1, wherein said amine compound has a boiling point of 100° C. or more.

5. An ammine solution containing:

an ammine compound which contains at least one of platinum and palladium, and 2-amino ethanol.

6. An ammine solution as claimed in claim 5, wherein said ammine compound is composed of at least one of dinitrodiammine platinum and dinitrodiammine palladium.

* * * * *